(12) United States Patent
Herrmann et al.

(10) Patent No.: US 6,380,889 B1
(45) Date of Patent: Apr. 30, 2002

(54) RECONNAISSANCE SONDE

(75) Inventors: Ralf-Joachim Herrmann, Eimke; Wolfgang Seidel, Lehre, both of (DE)

(73) Assignee: Rheinmetall W & M GmbH, Unterlüss (DE)

( * ) Notice: Subject to any disclaimer, the term of this patent is extended or adjusted under 35 U.S.C. 154(b) by 0 days.

(21) Appl. No.: 09/510,191

(22) Filed: Feb. 22, 2000

(30) Foreign Application Priority Data

Feb. 19, 1999 (DE) .......................... 199 06 970

(51) Int. Cl.⁷ .................... H04B 7/185; G01S 5/02
(52) U.S. Cl. ................. 342/357.09; 340/870.1; 367/3; 367/4
(58) Field of Search .................. 342/357.1, 357.09; 340/870.1; 367/3, 4

(56) References Cited

U.S. PATENT DOCUMENTS

| | | | |
|---|---|---|---|
| 5,186,418 A | * | 2/1993 | Lauritsen |
| 5,266,799 A | * | 11/1993 | Steinitz et al. |
| 5,962,537 A | | 10/1999 | Leviness |
| 5,983,161 A | * | 11/1999 | Lemelson et al. .......... 701/301 |
| 6,056,237 A | * | 5/2000 | Woodland .................. 244/3.15 |

FOREIGN PATENT DOCUMENTS

| | | |
|---|---|---|
| DE | 30 13 405 | 10/1983 |
| DE | 33 13 648 | 8/1987 |
| DE | 41 04 800 | 8/1992 |
| DE | 39 27 663 | 11/1998 |
| GB | 2 097 121 | 10/1982 |
| GB | 2 244 118 | 11/1991 |
| GB | 2 298 099 | 8/1996 |

* cited by examiner

*Primary Examiner*—Theodore M. Blum
(74) *Attorney, Agent, or Firm*—Venable; Gabor J. Kelemen

(57) ABSTRACT

A reconnaissance sonde to be dropped and erected in an area for wirelessly transmitting data to a data processing apparatus. The sonde includes a housing having top and bottom portions; a parachute disposed at the top housing portion; a plurality of support legs peripherally mounted on the housing in a circumferential array and having a folded state and a deployed state; a drive for simultaneously moving the support legs from the folded state into the deployed state upon landing of the sonde; a GPS navigation system, a magnetic field sensor and an attitude sensor for accurately determining a position and an attitude of the sonde; at least three target bearing determining sensors supported by the housing and distributed circumferentially; an electronic evaluating apparatus supported by the housing and connected to the GPS navigation system, the magnetic field sensor, the attitude sensor and the target bearing determining sensors for evaluating measured sensor signals thereof; a transmitting and receiving apparatus connected to the electronic evaluating apparatus for wirelessly transmitting evaluated signals to a remote data processing apparatus or an additional sonde; and a battery for supplying electric energy to the sonde components.

11 Claims, 5 Drawing Sheets

RECONNAISSANCE SONDE

CROSS REFERENCE TO RELATED APPLICATION

This application claims the priority of German Application No. 199 06 970.0 filed Feb. 19, 1999, which is incorporated herein by reference.

BACKGROUND OF THE INVENTION

This invention relates to a reconnaissance sonde which may be released as a payload from a carrier projectile in an area to be monitored, for example, a battlefield. The reconnaissance sonde, after settling on the ground, wirelessly transmits reconnaissance information to a data processing apparatus.

Reconnaissance sondes of the above-outlined type are known, for example, from German Patent No. 30 13 405. For determining target-relevant information, the known sondes have, for example, acoustic, optical, magnetic and/or radar sensors. The information detected by the sensors is wirelessly transmitted to an evaluating device associated with a fire control computer of a weapon system and the information is converted to flight path correcting values for a target-combating projectile. The German patent, however, offers no description concerning the actual structure of the reconnaissance sonde.

German Offenlegungsschrift (application published without examination) No. 41 04 800 also discloses a reconnaissance sonde which may be released as a payload from a carrier projectile in the zone of a battlefield. The sonde disclosed therein transmits target-relevant information as it descends and rotates, suspended from a parachute.

It is a disadvantage of such a reconnaissance sonde, among others, that a reconnaissance of the battlefield is feasible only during a relatively short period.

SUMMARY OF THE INVENTION

It is an object of the invention to provide an improved reconnaissance sonde of the above-outlined type which has a relatively compact construction and with which very accurate target determination is feasible during a continuous monitoring of a battlefield.

This object and others to become apparent as the specification progresses, are accomplished by the invention, according to which, briefly stated, the reconnaissance sonde includes a housing having top and bottom portions; a parachute disposed at the top housing portion; a plurality of support legs peripherally mounted on the bottom housing portion in a circumferential array and having a folded state and a deployed state; a drive for simultaneously moving the support legs from the folded state into the deployed state upon landing of the sonde; a GPS navigation system, a magnetic field sensor and an attitude sensor for accurately determining a position and an attitude of the sonde; at least three target bearing determining sensors supported by the housing and distributed circumferentially; an electronic evaluating apparatus supported by the housing and connected to the GPS navigation system, the magnetic field sensor, the attitude sensor and the target bearing determining sensors for evaluating measured sensor signals thereof; a transmitting and receiving apparatus connected to the electronic evaluating apparatus for wirelessly transmitting evaluated signals to a remote data processing apparatus or an additional sonde; and a battery for supplying electric energy to the sonde components.

It is a basic principle of the invention to provide the reconnaissance sonde with a GPS navigation system (Global Positioning System) and with at least one magnetic field sensor for orienting the sonde relative to the magnetic north pole, so that after the sonde lands on the ground, a very accurate attitude and position determination of the sonde itself and the (absolute) target-relevant information determined by the sonde may be obtained.

Advantageously an air bag is used for deploying the supporting legs of the reconnaissance sonde to ensure its uniform and rapid upright positioning immediately after it contacts the ground. The air bag, in its inflated state, has a circular shape relative to the longitudinal axis of the sonde housing and thus deploys all the supporting legs simultaneously.

Conventionally acoustic sensors (microphones) may be used for determining the bearing of a target as well as the target classification. Their measuring accuracy is increased by suitable measurements performed by seismic sensors (geophones). It is further feasible to determine the target bearing with the aid of a radar sensor and to perform the target classification by using an IR camera.

DESCRIPTION OF THE PREFERRED EMBODIMENTS

Figure 1:
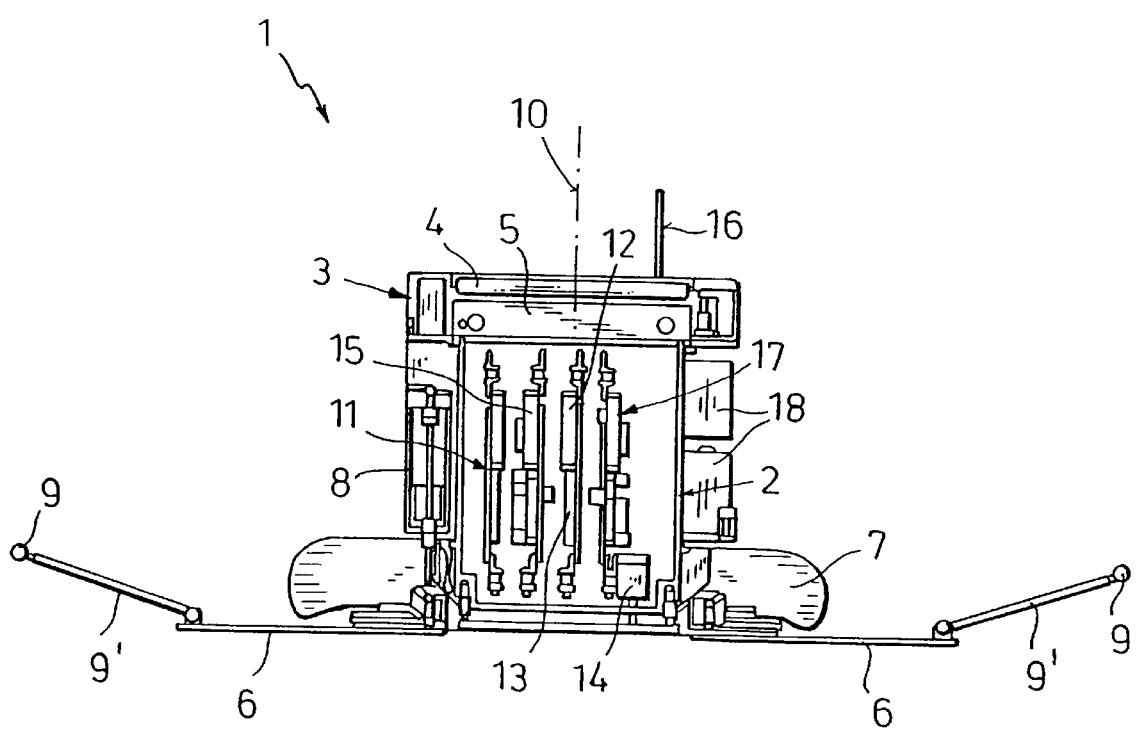
FIG. 1 is a schematic sectional elevational view of a reconnaissance sonde according to the invention, illustrated with deployed support legs.

FIG. 1 illustrates a reconnaissance sonde 1 structured according to the invention. The sonde 1 includes a cylindrical housing 2, a cassette 3 disposed at an upper portion of the housing for accommodating a fall-braking parachute 4 and a landing parachute 5.

At the lower part of the housing 2 six circumferentially distributed, outwardly pivoted (deployed) support legs 6 are arranged (only two are visible in FIG. 1). The deployment of the supporting legs 6 which, before the reconnaissance sonde 1 lands, are in a folded state and thus lie closely against the housing 2, is effected by an air bag 7 which is inflated by a gas generator 8 in a sudden, explosive manner to pivot the support legs 6 outwardly until they reach their terminal, deployed position. After deployment of the support legs 6, the latter are locked in their position and therefore remain in the deployed state even after the air bag 7 collapses.

At the ends of the support legs 6 situated remote from the housing 2, a respective acoustic sensor (microphone) 9 is secured by a spring-deployed cantilever arm 9' in such a manner that the six acoustic sensors 9 lie on a circle whose center coincides with the longitudinal axis 10 of the housing 2 of the reconnaissance sonde 1.

The housing 2 accommodates the following components for an exact position and attitude determination of the sonde 1: a GPS navigation system 11, a magnetic field sensor 12 for orienting the sonde relative to the magnetic north pole, two inclination sensors 13 for determining the inclination of the sonde with respect to the vertical and a seismic sensor 14 (geophone). Further, the housing 2 also contains an electronic evaluating device 15 which evaluates the various sensor signals and prepares target-relevant information which subsequently is advanced to a transmitting and receiving apparatus 17 connected with an antenna 16. The apparatus 17 transmits the signals to a data processing apparatus located externally of the battlefield; the data processing apparatus, for example, converts the signals to flight path correcting values.

The individual process steps of the sonde 1 are controlled by a control unit integrated in the electronic evaluating device 15.

Several batteries 18 are arranged about the housing 2 for supplying current to the individual structural groups of the reconnaissance sonde 1.

Figure 2:
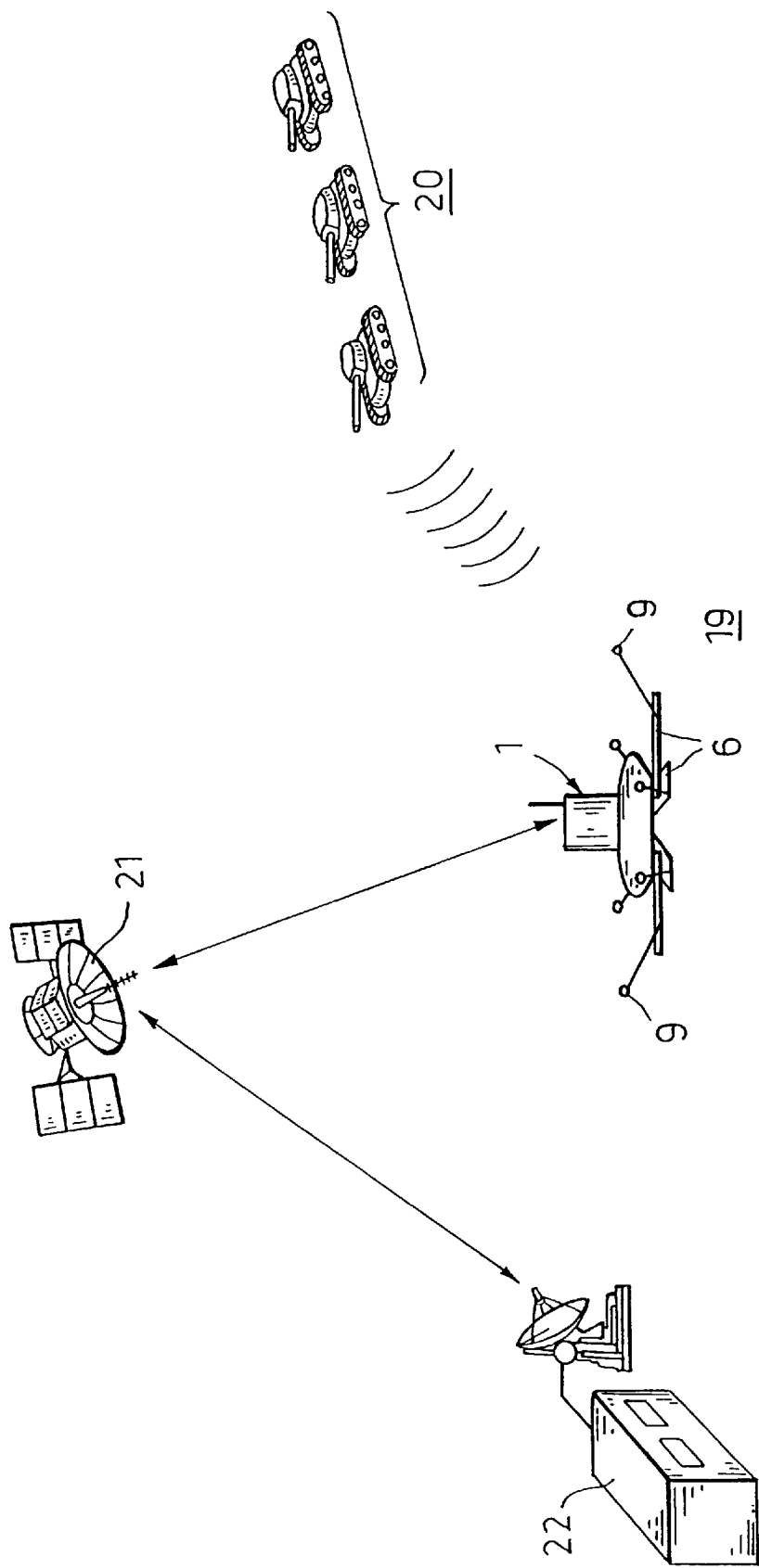
FIG. 2 is schematic perspective showing to illustrate the position determination of the reconnaissance sonde shown in FIG. 1 as well as the determination of target-relevant information and its wireless transmission to a data processing apparatus of a fire control computer.

FIG. 2 illustrates the reconnaissance sonde 1 set up on the ground 18 in the battlefield. The momentary position of potential targets 20 which penetrate into the monitoring zone of the sonde 1, such as a tank or other sound source, is continuously measured. From the signals of the acoustic sensor 9 the electronic evaluating device 15 (FIG. 1) computes the running time differences and therefrom the bearings relative to the coordinate system which is fixed in relation to the sonde. The timely course of the sound peak and the probability distribution of the speeds of the sound sources 20 then make possible an estimation of the distance between the sonde 1 and the respective sound source (target) 20. The classification of the targets 20 is effected by an evaluation of the measured sound peaks and their frequency spectrum as well as the seismic signal values measured by the geophone 14.

The result of the reconnaissance is transmitted by the transmitting and receiving apparatus 17 via a satellite 21 (FIG. 2) or via a non-illustrated relay station (mounted, for example, on a drone) to a data processing apparatus 22 of a fire control computer situated externally of the battlefield.

Figure 3:
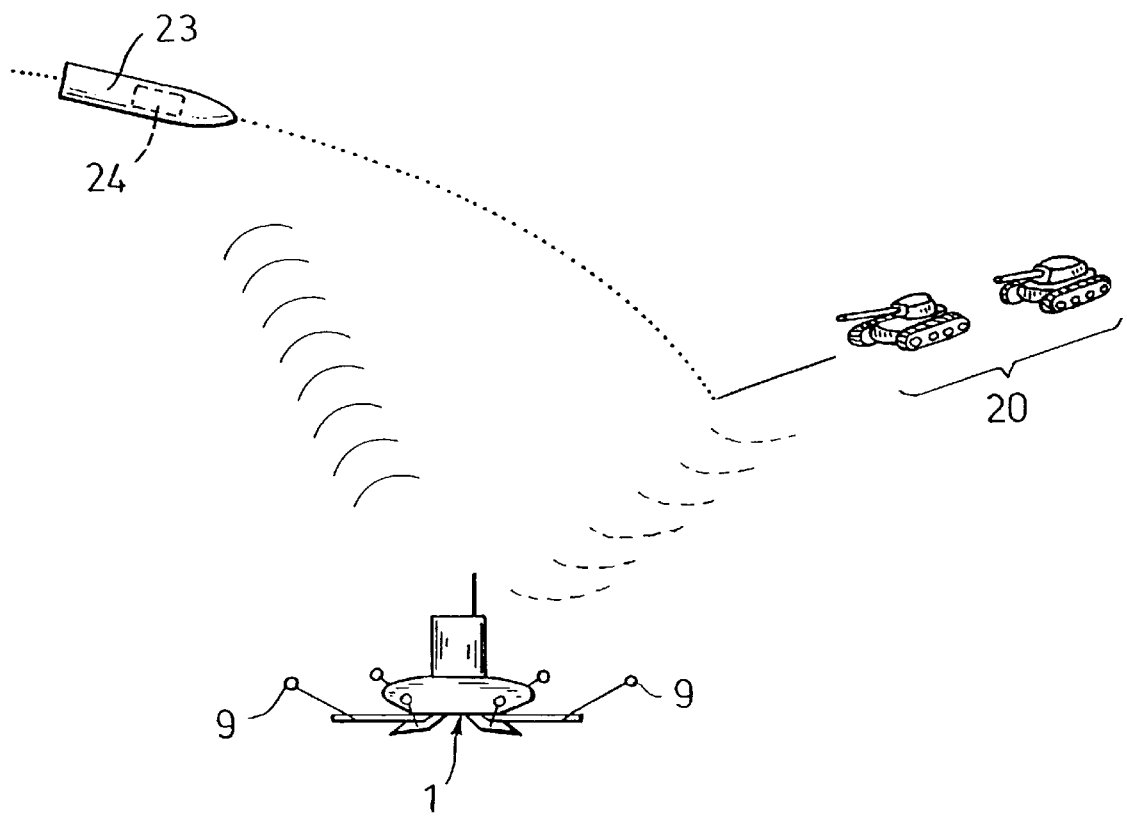
FIG. 3 is a schematic perspective showing to illustrate the transmission of target-relevant information by the reconnaissance sonde according to the invention to a guided projectile.

FIG. 3 illustrates an embodiment of the invention where the reconnaissance sonde 1 communicates directly with a guided projectile 23, that is, the target-relevant data are transmitted to a data processing apparatus 24 of the projectile 23 for flight path correction.

Figure 4:
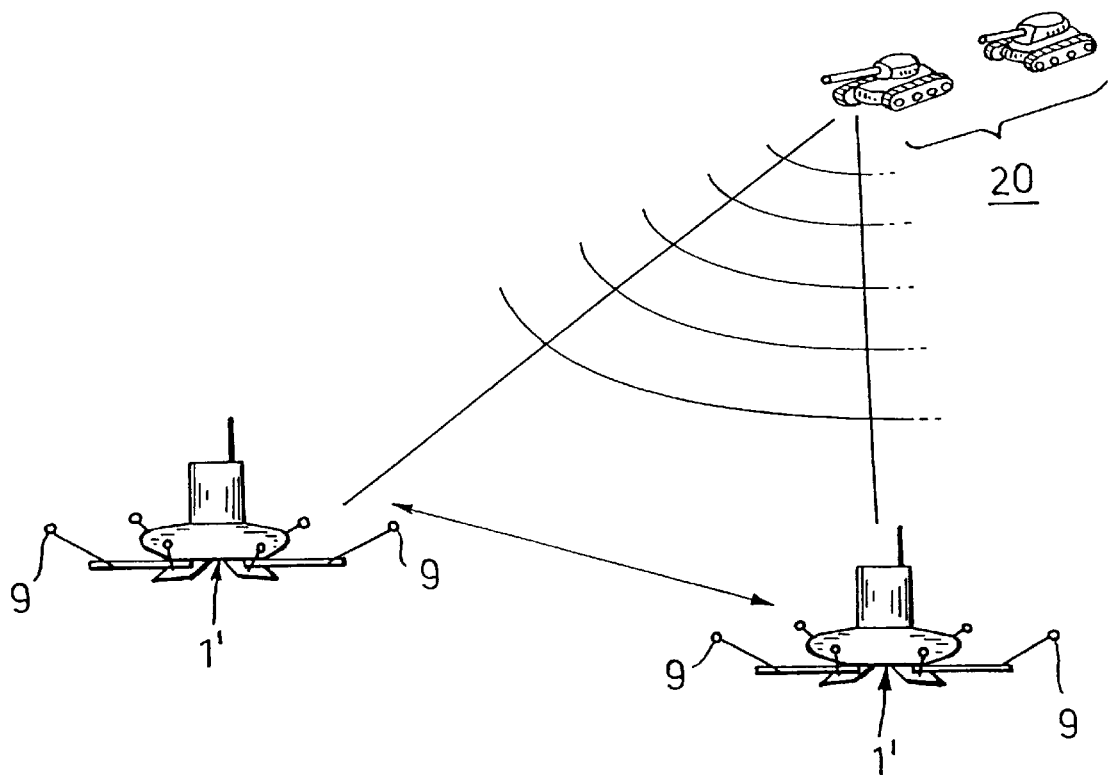
FIG. 4 is a schematic perspective illustration of two reconnaissance sondes radio-linked to one another.

FIG. 4 shows an embodiment of the invention where, for a more accurate location determination of the targets 20 by intersecting direction finding, two reconnaissance sondes 1 and 1' are radio-linked to one another and situated in the same battlefield.

Figure 5:
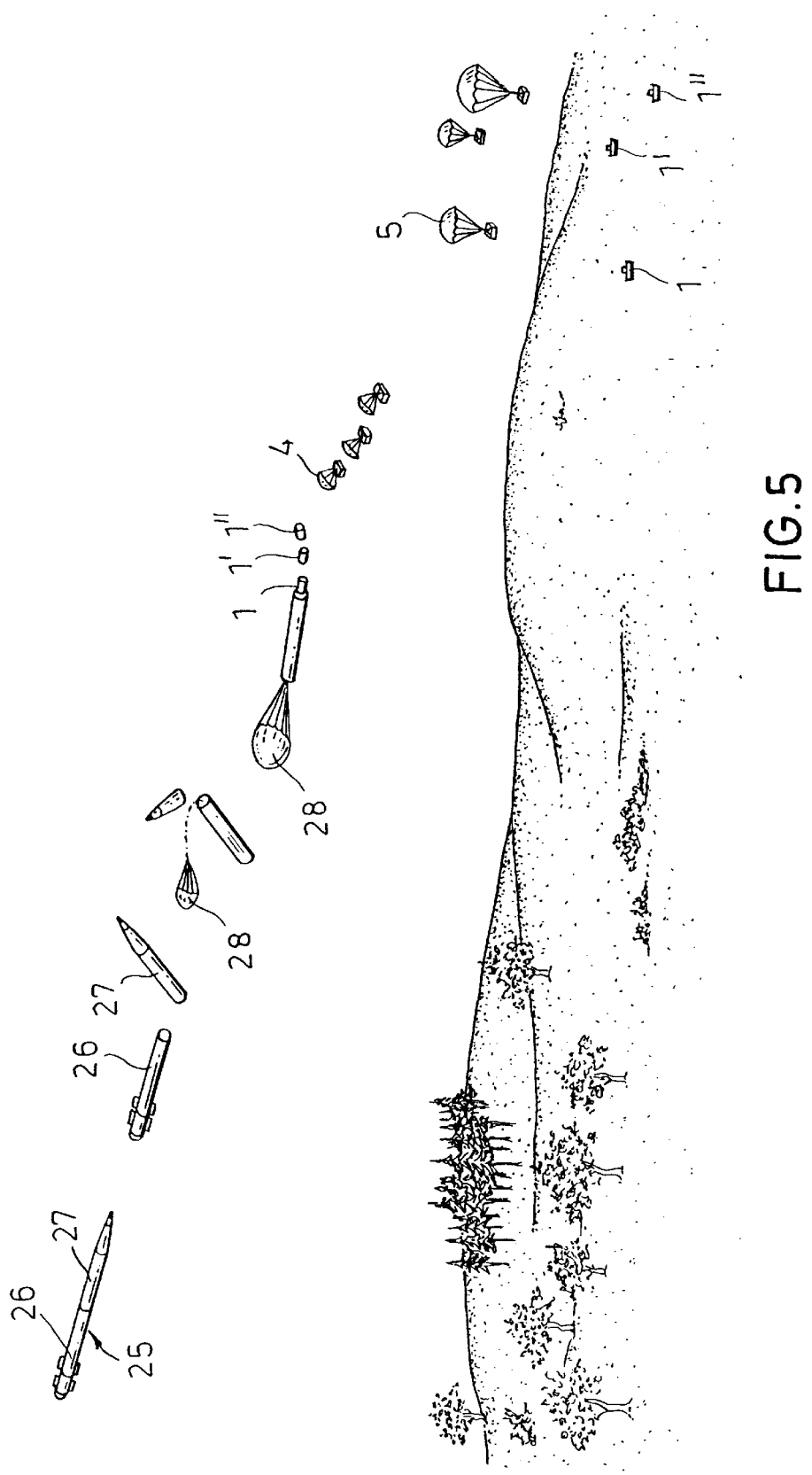
FIG. 5 is a schematic perspective illustration of the ejection of a plurality of reconnaissance sondes from a carrier projectile.

FIG. 5 schematically shows a simultaneous release of three reconnaissance sondes 1, 1' and 1" by a carrier projectile 25, for example, a rocket. The propulsion component 26 of the rocket 25 is, upon reaching predetermined coordinates, separated from its frontal carrier portion 27 and the fall of the carrier portion 27 is braked by a parachute 28. Subsequently, the reconnaissance sondes 1, 1' and 1" are ejected from the carrier portion 27. The individual sondes are first braked by their respective fall-braking parachute 4 and after separation of the parachute 4 they are set on the ground by means of the landing parachute 5. After separation of the parachute cassette 3 the sondes 1, 1' and 1" automatically erect themselves by the activation of the respective air bags 7.

It is to be understood that the invention is not limited to the above-described embodiments. Thus, for example, for a distance determination between the reconnaissance sonde and the target instead of acoustic sensors a radar sensor may be used which is preferably positioned in the upper portion of the sonde housing. For an accurate identification of the target it is also feasible to use a pivoting IR camera which follows the bearing of the target.

It will be understood that the above description of the present invention is susceptible to various modifications, changes and adaptations, and the same are intended to be comprehended within the meaning and range of equivalents of the appended claims.

What is claimed is:

1. A reconnaissance sonde to be dropped and erected in an area for wirelessly transmitting data to a data processing apparatus, comprising (a) a housing having top and bottom portions and a longitudinal axis;

(b) a parachute disposed at said top portion;

(c) a plurality of support legs peripherally mounted on said bottom portion in a circumferential array and having a folded state and a deployed state;

(d) drive means for simultaneously moving said support legs from said folded state into said deployed state upon landing of the sonde; said drive means including an airbag positioned within said array and having a deflated state and an inflated state; said air bag, upon passing from said deflated state to said inflated state, moving said support legs from said folded state into said deployed state; in said inflated state said air bag having a circular configuration being generally in axial alignment with said longitudinal axis;

(e) locking means for maintaining said support legs in said deployed state;

(f) a GPS navigation system, a magnetic field sensor and an attitude sensor for accurately determining a position and an attitude of the sonde;

(g) at least three target bearing determining sensors supported by said housing and distributed circumferentially;

(h) an electronic evaluating apparatus supported by said housing and connected to said GPS navigation system, said magnetic field sensor, said attitude sensor and said target bearing determining sensors for evaluating measured sensor signals thereof;

(i) a transmitting and receiving apparatus connected to said electronic evaluating apparatus for wirelessly transmitting evaluated signals to one of a remote data processing apparatus and an additional sonde; and (j) a battery for supplying electric energy to at least some of the components defined in (d) through (i).

2. The reconnaissance sonde as defined in claim 1, wherein target bearing determining sensors are at least one of an acoustic sensor and a radar sensor.

3. The reconnaissance sonde as defined in claim 1, further comprising an ejectable cassette mounted on said housing and accommodating said parachute.

4. The reconnaissance sonde as defined in claim 1, further comprising an IR camera whose images are processed in said electronic evaluating apparatus for target classification.

5. The reconnaissance sonde as defined in claim 1, in combination with a projectile and a data processing apparatus for receiving evaluated signals from said transmitting and receiving apparatus for target-combating; said data processing apparatus being carried by said projectile.

6. A reconnaissance sonde to be dropped and erected in an area for wirelessly transmitting data to a data processing apparatus, comprising
   (a) a housing having top and bottom portions and a longitudinal axis;
   (b) a parachute disposed at said top portion;
   (c) six support legs peripherally mounted on said bottom portion in a circumferential array and having a folded state and a deployed state;
   (d) six acoustic sensors carried respectively on six cantilever arms secured to respective said support legs; said acoustic sensors lying on an imaginary circle whose center coincides with said longitudinal axis; said acoustic sensors constituting target bearing determining sensors supported by said housing and distributed circumferentially;
   (e) drive means for simultaneously moving said support legs from said folded state into said deployed state upon landing of the sonde;
   (f) a GPS navigation system, a magnetic field sensor and an attitude sensor for accurately determining a position and an attitude of the sonde;
   (g) an electronic evaluating apparatus supported by said housing and connected to said GPS navigation system, said magnetic field sensor, said attitude sensor and said target bearing determining sensors for evaluating measured sensor signals thereof;
   (h) a transmitting and receiving apparatus connected to said electronic evaluating apparatus for wirelessly transmitting evaluated signals to one of a remote data processing apparatus and an additional sonde; and
   (i) a battery for supplying electric energy to at least some of the components defined in (d) through (h).

7. The reconnaissance sonde as defined in claim 6, wherein target bearing determining sensors are at least one of an acoustic sensor and a radar sensor.

8. The reconnaissance sonde as defined in claim 6, further comprising an ejectable cassette mounted on said housing and accommodating said parachute.

9. The reconnaissance sonde as defined in claim 6, further comprising a seismic sensor connected to said electronic evaluating apparatus.

10. The reconnaissance sonde as defined in claim 6, further comprising an IR camera whose images are processed in said electronic evaluating apparatus for target classification.

11. The reconnaissance sonde as defined in claim 6, in combination with a projectile and a data processing apparatus for receiving evaluated signals from said transmitting and receiving apparatus for target-combating; said data processing apparatus being carried by said projectile.

* * * * *